(12) United States Patent  
Sumi

(10) Patent No.: US 10,767,021 B2  
(45) Date of Patent: Sep. 8, 2020

(54) CUT SHEET AND METHOD FOR REDUCING CUTS

(71) Applicant: TBM CO., LTD., Tokyo (JP)

(72) Inventor: Yuichiro Sumi, Tokyo (JP)

(73) Assignee: TBM CO., LTD., Tokyo (JP)

( * ) Notice: Subject to any disclaimer, the term of this patent is extended or adjusted under 35 U.S.C. 154(b) by 42 days.

(21) Appl. No.: 16/077,152

(22) PCT Filed: Feb. 8, 2017

(86) PCT No.: PCT/JP2017/004591  
§ 371 (c)(1),  
(2) Date: Aug. 10, 2018

(87) PCT Pub. No.: WO2017/138568  
PCT Pub. Date: Aug. 17, 2017

(65) Prior Publication Data  
US 2019/0048156 A1    Feb. 14, 2019

(30) Foreign Application Priority Data

Feb. 10, 2016 (JP) .................................. 2016-023890

(51) Int. Cl.  
*C08J 5/18* (2006.01)  
*B26D 3/00* (2006.01)  
(Continued)

(52) U.S. Cl.  
CPC ................. *C08J 5/18* (2013.01); *B26D 3/00* (2013.01); *B26D 7/08* (2013.01); *C08J 7/042* (2013.01);  
(Continued)

(58) Field of Classification Search  
CPC .......... B26D 3/00; B26D 7/08; C08J 2323/12; C08J 2433/04; C08J 2475/04; C08J 5/18;  
(Continued)

(56) References Cited

U.S. PATENT DOCUMENTS

2002/0041060 A1   4/2002  Liang  
2014/0100328 A1   4/2014  Sumi et al.  
(Continued)

FOREIGN PATENT DOCUMENTS

JP        4832176 A    4/1973  
JP       10157745 A    6/1998  
(Continued)

OTHER PUBLICATIONS

International Search Report corresponding to Application No. PCT/JP2017/004591; dated May 9, 2017.

(Continued)

*Primary Examiner* — Lawrence D Ferguson  
(74) *Attorney, Agent, or Firm* — Cantor Colburn LLP

(57) ABSTRACT

Provided is a cut sheet having sufficient water resistance and having fewer sharp protrusions in the end face despite including a large amount of inorganic particles and a method of reducing cuts. The cut sheet is formed of a resin composition including inorganic particles of 50% by mass or larger relative to the total mass of the composition and a thermoplastic resin. The cut sheet has a water absorption rate of 10% or lower measured in accordance with JIS K-7209. The actual occupancy rate of the exposed area of the inorganic particles is lower by at least 2% than the theoretical occupancy rate of the area of the inorganic particles in at least one end face.

6 Claims, 3 Drawing Sheets

(51) Int. Cl.
*C08J 9/00* (2006.01)
*B26D 7/08* (2006.01)
*C08J 7/04* (2020.01)
*C08K 3/26* (2006.01)

(52) U.S. Cl.
CPC .................. *C08J 9/00* (2013.01); *C08K 3/26* (2013.01); *C08J 2323/12* (2013.01); *C08J 2433/04* (2013.01); *C08J 2475/04* (2013.01); *C08K 2003/265* (2013.01)

(58) Field of Classification Search
CPC ....... C08J 7/042; C08J 9/00; C08K 2003/265; C08K 3/26
See application file for complete search history.

(56) References Cited

U.S. PATENT DOCUMENTS

2014/0302298 A1 10/2014 Wilfong et al.
2015/0353695 A1 12/2015 Sumi

FOREIGN PATENT DOCUMENTS

| JP | H11277623 A | 10/1999 |
| JP | 2015062966 A | 4/2015 |
| WO | 2012165311 A1 | 12/2012 |
| WO | 2014109267 A1 | 1/2017 |

OTHER PUBLICATIONS

JP Notice of Reasons for Rejection corresponding to Application No. 2017-566979; dated Jul. 31, 2018.
Extended European Search Report corresponding to Application No. 17750289.5; dated Aug. 14, 2019.

CUT SHEET AND METHOD FOR REDUCING CUTS

CROSS REFERENCE TO RELATED APPLICATIONS

This is the U.S. national stage of application No. PCT/JP2017/004591, filed on Feb. 8, 2017. Priority under 35 U.S.C. § 119(a) and 35 U.S.C. § 365(b) is claimed from Japanese Application No. 2016-023890, filed on Feb. 10, 2016, the disclosures all of which are also incorporated herein by reference.

FIELD

The present invention relates to a cut sheet and a method for reducing cuts.

BACKGROUND

Conventionally, a sheet using a thermoplastic resin is used for various applications. The thermoplastic resin itself is water repellent and thus a problem in terms of water resistance hardly arises. The water absorption rate of the sheet, however, is significantly increased by blending inorganic particles and carrying out stretching treatment.

Therefore, in the case of aiming at improving brightness and opacity by blending the thermoplastic resin with the inorganic particles and carrying out the stretching treatment, an increase in water absorption rate is required to be reduced.

For example, Patent Literature 1 discloses a thin film material for processing containing a thermoplastic resin and an inorganic substance powder in a weight ratio of 18:82 to 50:50. According to Patent Document 1, the thin film material can reduce a degree of water absorption by stretching the thin film material about 1.2 times to about 4.0 times so that the specific gravity becomes 1.4 or smaller and 0.6 or larger.

CITATION LIST

Patent Literature

Patent Literature 1: WO 2014/109267 Pamphlet

SUMMARY

Technical Problem

However, when the sheet is used as a cut sheet, the sheet is cut many times in order to use the cut sheet as an appropriate size and thus many sections are generated. This may generate a part having insufficient water resistance depending on the sections. In particular, when the inorganic particles are blended to the sheet in a large amount and stretching treatment of the resultant sheet is carried out, sufficient water resistance is difficult to obtain.

When a sharp part in the end face of the cut sheet exists, cuts may be generated by the sharp part.

The present invention has been made in view of the above circumstances and an object of the present invention is to provide a cut sheet having sufficient water resistance and having fewer sharp protrusions in the end face despite including a large amount of inorganic particles and a method of reducing cuts.

Solution to Problem

The inventors of the present invention have found that a cut sheet containing a large amount of inorganic particles can obtain sufficient water resistance by a predetermined production method and sharp protrusions are difficult to be generated by controlling the occupancy rate of the inorganic particles in the section of the sheet, and thus have accomplished the present invention. More specifically, the present invention aims to provide the followings:

(1) The present invention provides a cut sheet that is formed of a resin composition including inorganic particles of 50% by mass or larger relative to as total mass of the composition and a thermoplastic resin. The cut sheet has a water absorption rate of 10% or lower measured in accordance with JIS K-7209. An actual occupancy rate of an exposed area of inorganic particles is lower by at least 2% than a theoretical occupancy rate of an area of inorganic particles in at least one end face.

(2) The present invention provides the cut sheet according to (1), in which a cured film of a resin composition including a synthetic resin and/or a natural resin is formed on one surface or both surfaces of the cut sheet as a separate body from the cut sheet.

(3) The present invention provides the cut sheet according to (1) or (2), in which the cut sheet has a size of B3 size defined in JIS P0138 or smaller.

(4) The present invention provides the cut sheet according to any one of (1) to (3), in which the cut sheet is used for reducing generation of cuts.

(5) The present invention provides a method for reducing cuts generated by a cut sheet, the method including:

setting an actual occupancy rate of an exposed area of inorganic particles lower than a theoretical occupancy rate of an area of inorganic particles in at least one end face in the cut sheet formed of a resin composition including the inorganic particles of 50% by mass or larger relative to a total mass of the composition and a thermoplastic resin.

(6) The present invention provides a method for reducing cuts generated by a cut sheet, the method including:

covering at least a part of surfaces of inorganic particles with a thermoplastic resin in at least one end face in the cut sheet formed of a resin composition including the inorganic particles of 50% by mass or larger relative to a total mass of the composition and the thermoplastic resin.

Advantageous Effects of Invention

According to the present invention, a cut sheet having sufficient water resistance and having fewer sharp protrusions in the end face despite including a large amount of inorganic particles and a method of reducing cuts can be provided.

DESCRIPTION OF EMBODIMENTS

Figure 1:
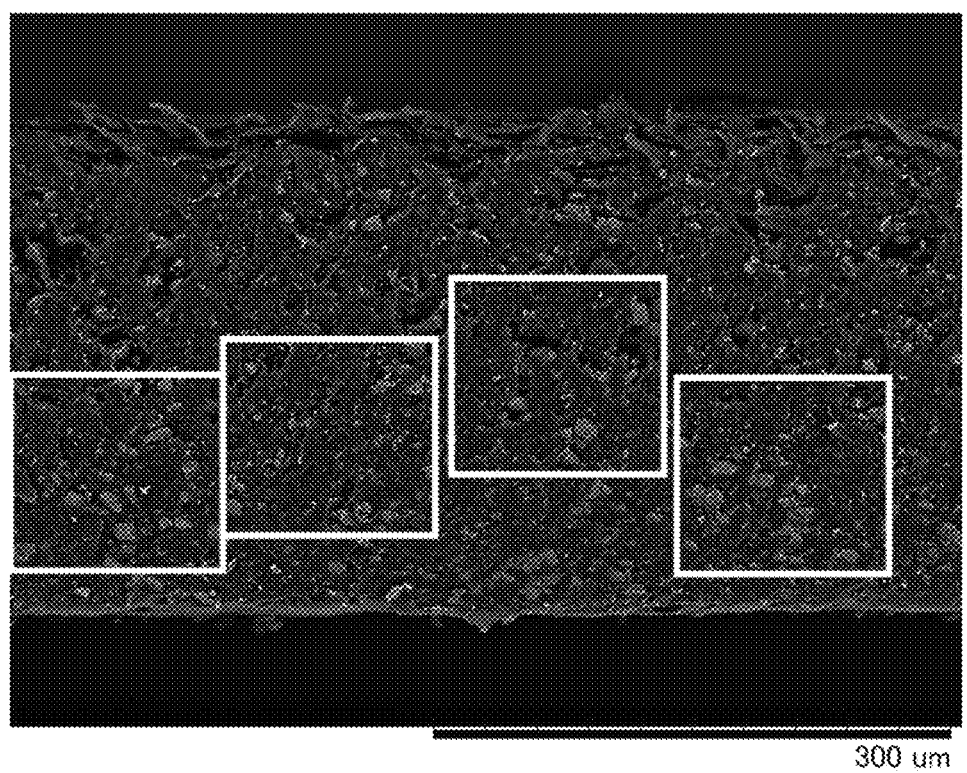
FIG. 1 is a photograph illustrating an electron microscopic image of the section of the sheet obtained in Example 2.

Hereinafter, the embodiments of the present invention will be described in detail. The present invention, however, <Cut Sheet>

The cut sheet according to the present invention is formed of a resin composition including inorganic particles of 50% by mass or larger relative to the total mass of the composition and a thermoplastic resin. The cut sheet has a water absorption rate of 10% or lower measured in accordance with JIS K-7209. The actual occupancy rate of the exposed area of the inorganic particles is lower by at least 2% than the theoretical occupancy rate of the area of the inorganic particles in at least one end face. The "cut sheet" refers to a sheet cut into finished dimensions desired by users and refers to a sheet of which at least one end face is cut.

In the cut sheet according to the present invention, the actual occupancy rate of the exposed area of the inorganic particles is lower by at least 2% than the theoretical occupancy rate of the area of the inorganic particles in one end face, with the inorganic particles emerging in the end face being noticed, whereby sharp protrusions are difficult to be generated in the end face during cutting and thus the generation of cuts on fingers or the like of the user can be reduced. This is presumably because a part of the surface of the inorganic particles is easily covered by setting the actual occupancy rate of the exposed area of the inorganic particles lower by at least 2% than the theoretical occupancy rate of the area of the inorganic particles in one end face.

Although this phenomenon is unclear, the blade used for cutting the sheet passes through the thermoplastic resin so as to push off the inorganic particles contained as many as 50% by mass or larger when the sheet is cut, so that the surfaces of the inorganic particles exposed in the end face are considered to be easily covered with the thermoplastic resin. This is considered to be one of the reasons why sharp protrusions are difficult to be generated in the end face at the time of cutting.

The cut sheet is obtained by melt-kneading a resin composition containing the inorganic particles and the thermoplastic resin and forming the resin composition into a sheet shape. When the resin composition is stretched into the sheet shape, peeling occurs at the interface between the inorganic particles and the thermoplastic resin. The peeling occurring at this interface propagates and expands by stretching the resin composition and thus voids are formed in the resin composition. When the voids emerging in the section are closed voids, water absorption is difficult to proceed, whereas, when the voids emerging in the section are open voids, water absorption easily proceeds and water resistance tends to be impaired. In the present invention, in particular, a large amount of inorganic particles as many as 50% by mass or larger are contained. The actual occupancy rate of the exposed area of the inorganic particles being lower by at least 2% than the theoretical occupancy rate of the area of the inorganic particles is considered to contribute to reduction in water absorption from the sheet end face and control of the water absorption rate of the sheet so as to be 10% or lower.

The phrase "the actual exposed area of the inorganic particles" means the area of the inorganic particles visually observed from the image by the electron microscope at the entire end face or any part of the end face of the cut sheet. The phrase "actual occupancy rate of the exposed area of the inorganic particles" refers to the occupancy rate of the exposed area of the inorganic particles on the entire end face of the cut sheet or the occupancy rate or average occupancy rate of the inorganic particles in the area of any one or more sections on the entire end face of the cut sheet. The "actual occupancy rate of the exposed area of the inorganic particles" can be calculated from images observed with an electron microscope. For example, the actual occupancy rate of the exposed area of the inorganic particles may be an average occupancy rate determined by selecting any four sections in the same plane in the section so that the area per section is 0.014 mm$^2$, measuring the area occupied by the inorganic particles with respect to the area of each section, and calculating the average thereof. In any one or more sections, the positions of the sections do not overlap each other. Any one or more sections are not particularly limited as long as the sections are positioned in one end face of the cut sheet. Each section is preferably adjacent to at least one other section. The term "adjacent" here means that the distance between the closest points of approach of each section is at least 0.1 mm or shorter. The distance is preferably at least 0.09 mm or shorter, more preferably 0.07 mm or shorter, further preferably 0.04 mm or shorter, and further more preferably 0.01 mm or shorter. Any one or more sections may be in any shape and may be a quadrangle (square, rectangular, or the like.), a circle, or the like.

With regard to the theoretical area of the inorganic particles, when the entire area of one end face of the cut sheet (or the area of any one or more sections on the entire end face) is determined to be A, the theoretical area occupied by the inorganic particles in A is determined to be B, the area occupied by the thermoplastic resin is determined to be C, the area occupied by the voids in A is determined to be D, and the area occupied by other optional components in A is determined to be E, the following relational expression is satisfied.

$$A=B+C+D+E$$

When the theoretical occupancy rate of the area of the inorganic particles is expressed using A and B having the above relation, the theoretical occupancy rate of the area of the inorganic particles is represented by B/A×100(%). The theoretical occupancy rate of the area of the inorganic particles is calculated from, for example, the density (specific gravity) of the cut sheet, the content ratio of the inorganic particles to the entire cut sheet, and the density (specific gravity) of the inorganic particles.

The actual occupancy rate of the exposed area of the inorganic particles is not particularly limited as long as the actual occupancy rate of the exposed area of the inorganic particles is lower by at least 2% than the theoretical occupancy rate of the area of the inorganic particles. The actual occupancy rate of the exposed area of the inorganic particles is preferably lower by at least 3% than the theoretical occupancy rate of the area of the inorganic particles, more preferably lower by at least 4%, and further preferably lower by at least 5%. As for the upper limit, the actual occupancy rate of the exposed area of the inorganic particles may be 20% or lower (15% or lower, 10% or lower, or the like) lower than the theoretical occupancy rate of the area of the inorganic particles.

One end face where the actual occupancy rate of the exposed area of the inorganic particles is lower by at least 2% than the theoretical occupancy rate of the area of the inorganic particle is formed by the resin flowing out from the inside of the sheet at the time of cutting, and therefore refers to an end face integrated with a resin molded body forming the cut sheet. The number of the end faces in the present invention is not limited and may be 3 or more (for example, 4, 5, and 6). Of the end surfaces of the cut sheet, the number of the end surface where the actual occupancy rate of the exposed area of the inorganic particles is lower by at least 2% than the theoretical occupancy rate of the area of the inorganic particles in the total number of the end faces is preferably at least 10% of the number of the end faces, more preferably at least 25% of the number of the end faces, further preferably at least 50% of the number of the end faces, and further more preferably at least 75% of the number of the end faces, and most preferably 100% of the number of the end faces.

The water absorption rate measured in accordance with HS K-7209 in the present invention is not limited as long as the water absorption rate is 10% or lower. The water absorption rate is preferably 8% or lower, more preferably 5% or lower, further preferably 3% or lower, and further more preferably 1% or lower.

The amount of the inorganic particles contained in the entire composition is 50% by mass or larger, preferably 55% by mass or larger, and further preferably 60% by mass or larger. The cut sheet according to the present invention has sufficient water resistance and sharp protrusions are difficult to be formed in the end face even when stretching treatment is carried out for the cut sheet according to the present invention containing the inorganic particles in an amount of 50% by mass or larger. The upper limit of the amount of the inorganic particles contained in the entire composition is not particularly limited. The upper limit is preferably 85% by mass or smaller and more preferably 80% by mass or smaller because the excessive amount of the inorganic particles may cause reduction in water resistance or may increase more sharp protrusions.

Examples of the inorganic particles according to the present invention include particles of calcium carbonate, titanium oxide, silica, clay, talc, kaolin, and aluminum hydroxide. These inorganic particles may be used singly or in combination of two or more of them. In order to improve the dispersibility or reactivity of the inorganic particles, the surface of the inorganic particles may be previously modified by a conventional method.

As the average particle diameter of the inorganic particles, the inorganic particles having an average particle diameter of 0.1 μm to 50 μm is preferably used and the inorganic particles having an average particle diameter of 1.0 μm to 10 μm is more preferably used from the viewpoint that the actual occupancy rate of the exposed area of the inorganic particles is controlled so as to be lower by at least 2% than the theoretical occupancy rate of area of the inorganic particles. The average particle diameter of the inorganic particles in the present invention is a 50% particle diameter (d50) obtained from the distribution curve of the cumulative percent measured by a laser diffraction type particle size distribution measuring apparatus.

Examples of the thermoplastic resin according to the present invention include polyolefin resins such as polypropylene and polyethylene, vinyl resins such as polystyrene, polyester resins such as polyethylene terephthalate, and recycled resins. These thermoplastic resins may be used singly or in combination of two or more of them. From the viewpoint that the actual occupancy rate of the exposed area of the inorganic particles is easily controlled to lower by at least 2% than the theoretical occupancy rate of the area of the inorganic particles, the polyolefin resins such as polypropylene and polyethylene are preferable and polyethylene and polypropylene having slightly lower molecular weights are particularly preferable.

As described above, the melt mass flow rate (MFR) of the thermoplastic resin is preferably 1 g/10 min to 2 g/10 min or 2 g/10 min or higher from the viewpoint of setting the occupancy rate of the exposed area of the inorganic particles emerging in the end face lower than the theoretical occupancy rate of area of the inorganic particles.

The melt mass flow rate is an index indicating fluidity at the time of melting and means a value measured in accordance with JIS K 7210. Specifically, as the method for measuring the melt flow rate, a method for measuring the melt flow rate under conditions of a load of 21.18 N and a temperature of 230° C. with a melt indexer in accordance with JIS K 7210 is exemplified.

For the cut sheet according to the present invention, a cured film made of a resin composition containing a synthetic resin and/or a natural resin and not containing the inorganic particles may be formed or is not necessarily formed on one surface or both surfaces of the sheet (hereinafter, may be simply referred to as a surface) as a separate body from the cut sheet. In particular, when the thermoplastic resin is polypropylene, the cured film is preferably formed on the surface of the sheet. Examples of the synthetic resin include a urethane resin and an acrylic resin from the viewpoint of the balance between water resistance and printability.

In addition to the thermoplastic resin and the inorganic particles described above, the resin composition according to the present invention may contain one or more of auxiliary agents selected from a lubricant, an antioxidant, an ultraviolet absorber, a pigment for coloration, a dispersant, an antistatic agent, a flame retardant, and the like within a range not contrary to the object. Of these auxiliary agents, the auxiliary agents that are considered to be particularly important will be described by way of examples. The auxiliary agents, however, are not limited to the examples.

Examples of the lubricant may include fatty acid-based lubricants such as stearic acid, hydroxystearic acid, complex type stearic acid, and oleic acid; aliphatic alcohol-based lubricants; aliphatic amide-based lubricants such as stearoamide, oxystearoamide, oleylamide, erucylamide, ricinolamide, behenamide, methylolamide, methylene bis-stearoamide, methylene bis-stearobehenamide, bisamic acids of higher fatty acids, and complex type amides; aliphatic ester-based lubricants such as n-butyl stearate, methyl hydroxystearate, polyhydric alcohol fatty acid esters, saturated fatty acid esters, and ester-based waxes; and fatty acid metal soap-based lubricants.

As the antioxidant, phosphorus-based antioxidants, phenol-based antioxidants, and pentaerythritol-based antioxidants can be used. Phosphorus-based antioxidant stabilizers, more specifically phosphorus-based antioxidant stabilizers such as phosphite esters and phosphate esters are preferably used. Examples of phosphite esters include triesters, diesters, and monoesters of phosphorous acid such as triphenyl phosphite, tris-nonylphenyl phosphite, and tris-(2,4-di-tert-butylphenyl) phosphite.

Examples of the phosphate ester include trimethyl phosphate, triethyl phosphate, tributyl phosphate, trioctyl phosphate, triphenyl phosphate, tricresyl phosphate, tris-(nonylphenyl) phosphate, and 2-ethylphenyldiphenyl phosphate. These phosphorus-based antioxidants may be used singly or in combination of two or more of them.

Examples of the phenol-based antioxidants include α-tocopherol, butylhydroxytoluene, sinapyl alcohol, vitamin E, octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, and tetrakis-[3-(3,5-di-tert-butyl-4-hydroxyphenyl)propionyloxymethyl]

methane. These phenol-based antioxidants may be used singly or in combination of two or more of them.

The cut sheet according to the present invention can be produced by forming a sheet by a colander method, an extrusion method, or the like using the thermoplastic resin and the inorganic particles and the above auxiliary agents if necessary so that the water absorption rate, the actual occupancy rate of the area of the inorganic particles, and the theoretical occupancy rate of the area of the inorganic particles satisfy the above ranges and uniaxially stretching the sheet in the longitudinal or transverse direction or sequentially stretching or simultaneously biaxially stretching the sheet in the longitudinal and transverse directions.

The thickness of the sheet after stretching (the thickness of the cut sheet) varies depending on the purpose of use and the sheet having a thickness of 30 µm to 500 µm is usually used and the sheet having a thickness of 80 µm to 400 µm is suitably used. When the thickness of the sheet after stretching is smaller than 30 µm, the mechanical properties are insufficient due to high filling of the inorganic particles, so that the sheet is inappropriate.

In the present invention, the "water absorption rate" and the difference between "the actual occupancy rate of the exposed area of the inorganic particles" and "the theoretical occupancy rate of the area of the inorganic particles" can be adjusted by combining the stretching ratio, the extrusion temperature, and the like. For example, for the stretching ratio with respect to a water absorption rate of 10% or lower, the sheet is usually stretched in a range of 1.1 times to 2.0 times. By preferably stretching in a range of 1.1 times to 2.0 times, an increase in water absorption rate tends to be easily reduced. Control of the actual occupancy rate of the exposed area of the inorganic particles to be lower by at least 2% than the theoretical occupancy rate of the area of the inorganic particles is easily carried out by setting the melt mass flow rate of the thermoplastic resin to be higher.

The required stretching ratio can also be obtained by calculation. A weight per 1 m² of sheet intermediate before stretching W (g/m²) (also referred to as grammage) is measured. The stretching ratio (X times in the longitudinal direction and Y times in the transverse direction) is determined by the following formula using the apparent specific gravity D and the aspect ratio R (the ratio of the stretching ratio in the longitudinal direction and the transverse direction) of the product defined in a production plan and the target value T (cm) of the thickness of the product after the transverse stretching and the sheet can be stretched. In addition, the required stretching ratio can be easily estimated by the operating experience of each apparatus.

$$X^2 = W \times 10^{-4}/(D \times Z \times R \times T)$$

$$X = RY \quad \text{(Formulae 1)}$$

where

D: Apparent specific gravity of product defined in production plan

R: Aspect ratio R (ratio of stretching ratio in longitudinal direction and transverse direction) of product defined in production plan T: Target value of thickness of product after transverse stretching W: Weight (g) per 1 m² of sheet before longitudinal stretching X: Stretching ratio in longitudinal direction Y: Stretching ratio in transverse direction Z: Shrinkage ratio or elongation ratio of length of the sheet in transverse direction by longitudinal stretching The actual occupancy rate of the exposed area of the inorganic particles is easily controlled to a desired range by combining the longitudinal stretching and the transverse stretching and appropriately setting the stretching ratio. On the other hand, when each of the longitudinal stretching and the transverse stretching is increased to at least 2 times, the open voids increase and the water absorption property becomes excessively large, resulting in tendency of decrease in water resistance.

The cut sheet according to the present invention can be cut into sizes of, for example, A1 size, A2 size, A3 size, A4 size, A5 size, A6 size, A7 size, B1 size, B2 size, B3 size, B4 size, B5 size, B6 size, and B7 size defined in JIS P0138 according to the application of the user. The cut sheet according to the present invention can be suitably used as a sheet having a large influence of the water absorption from the section, in particular in a small size such as a size of B3 size (area 1870 cm²) or smaller, because the water absorption property in the section does not change even when the sheet is cut at any position. In a paper sheet, the cut end face emerges as sharp protrusions with the fiber bundles being exposed, so that when the paper sheet is used as cards such as business cards, the fingers or the like of the user may be damaged. In contrast, the cut sheet according to the present invention has fewer sharp protrusions in the end faces as described above, so that the fingers or the like of the user are difficult to damage. Therefore, the cut sheet is suitably used as cards such as business cards.

At the time of cutting, the cut sheet is preferably cut with a cutter or scissors. This makes it easy to control the actual occupancy rate of the exposed area of the inorganic particles to be lower than the theoretical occupancy rate of the area of the inorganic particles in one end face. The actual occupancy rate of the exposed area of the inorganic particles may be determined by an electron microscope and the above conditions may be controlled according to this result.

<Method for Reducing Cuts Generated by Cut Sheet>

The present invention includes a method for reducing cuts caused by a cut sheet, the method including: setting the actual occupancy rate of the exposed area of inorganic particles lower than the theoretical occupancy rate of the area of inorganic particles in at least one end face in the cut sheet formed of a resin composition including the inorganic particles of 50% by mass or larger relative to the total mass of the composition and a thermoplastic resin.

In the present invention, fewer sharp protrusions are generated when the sheet formed from the resin composition is cut by setting the actual occupancy rate of the exposed area of the inorganic particles lower than the theoretical occupancy rate of the area of the inorganic particles in one end face of the sheet. Therefore, generation of cuts on the fingers of the user by the protrusions can be reduced.

The present invention also includes a method for reducing cuts generated by a cut sheet, the method including:

covering at least a part of the surfaces of inorganic particles with a thermoplastic resin in at least one end face in the cut sheet formed of a resin composition including inorganic particles of 50% by mass or larger relative to the total mass of the composition and the thermoplastic resin.

In the present invention, fewer sharp protrusions are generated when the sheet formed from the resin composition is cut by covering at least a part of the surfaces of inorganic particles in one end face with a thermoplastic resin. Therefore, generation of cuts on the fingers of the user by the protrusions can be reduced.

EXAMPLES

Hereinafter, the present invention will be specifically described with reference to Examples. The present invention, however, is not limited thereto.

Example 1

A resin composition containing 40% by mass of polypropylene resin (density 0.91 [g/cm$^3$]) and 60% by mass of heavy calcium carbonate (average particle diameter 5 μm) as main components and an antistatic agent in an amount of 0.5% by mass relative to the main components (the content of the calcium carbonate in the resin composition was 59.7% by mass and the content of the polypropylene resin was 39.8% by mass) was molded with a twin screw kneading extruder and subsequently stretched to 1.5 times using a longitudinal stretching machine to form a sheet. The sheet was cut using a desktop cutter.

Example 2

A urethane resin was applied onto the front and back surfaces of the sheet prepared in Example 1 with a microgravure coating machine and the resultant sheet was cut with a desktop cutter.

Example 3

An acrylic resin was applied onto the front and back surfaces of the sheet prepared in Example 1 with a microgravure coating machine and the resultant sheet was cut with a desktop cutter.

[Evaluation 1]

The physical properties (a density, a grammage, a thickness, strength at break, elongation at break, tear strength, gloss, brightness, opacity, and a water absorption rate) of the cut sheets produced in Examples 1 to 3 were evaluated. The results are listed in Table 1. The density is a value measured in accordance with JIS K7112, the grammage in accordance with JIS P8124, the thickness in accordance with JIS K7130, the strength at break and elongation at break in accordance with JIS K7162, the tear strength in accordance with JIS K7128-3, the gloss in accordance with JIS P8142, the brightness in accordance with JIS P8148, and the opacity in accordance with JIS P8149. The water absorption rate is a value calculated in accordance with JIS K 7209 by immersing the cut sheet in pure water for 24 hours, taking the immersed cut sheet out from water, lightly wiping off water with a cloth, and measuring the mass of the wiped cut sheet within 1 minute. The densities of the cut sheets other than the coated part in Examples 2 and 3 are the same as the density in Example 1.

From the results in Table 1, it was confirmed that, in any of the cut sheets of Examples, the sheets had excellent strength while having high brightness and opacity as a sheet and had low water absorption rates and excellent water resistance.

TABLE 1

|  |  |  | Example 1 Not coated | Example 2 Urethane coating | Example 3 Acrylic coating |
|---|---|---|---|---|---|
| Density (Specific gravity) | [kg/m$^3$] |  | 1076 | 1071 | 1070 |
| Grammage | [g/m$^2$] |  | 322.5 | 324.7 | 323.6 |
| Thickness | [mm] |  | 0.300 | 0.303 | 0.302 |
| Strength at break | [MPa] | MD | 23.2 | 24.7 | 11.2 |
|  |  | TD | 11.6 | 11.4 | 24.0 |
| Elongation at break | [%] | MD | 161.8 | 230.7 | 207.5 |
|  |  | TD | 242.0 | 243.9 | 155.1 |
| Tear strength | [N/mm] | MD | 101.0 | 71.4 | 46.5 |
|  |  | TD | 45.9 | 26.7 | 89.1 |
| Gloss (front face) 60° | [%] |  | 4.5 | 7.2 | 14.1 |
| Gloss (back face) 60° | [%] |  | 3.4 | 4.6 | 8.0 |
| Brightness | [%] |  | 95.9 | 94.0 | 95.2 |
| Opacity | [%] |  | 94.9 | 96.1 | 93.6 |
| Water absorption rate | [%] |  | 0.9 | 2.0 | 4.7 |

Example 4

A sheet according to Example 4 was prepared by the same procedure except that the thickness of the sheet was changed to 120 μm from the thickness of the sheet in Example 1.

[Evaluation 2]

One cut end face of the sheet in Example 2 and one cut end face of the sheet in Example 3 were observed with a microscope (MINISCOPE™ 3000, manufactured by Hitachi High-Technologies Corporation). As Comparative Example, a paper sheet (plain paper) prepared from wood pulp was also prepared. Observation results of the end faces are illustrated in FIG. 1 to FIG. 3.

The occupancy rates of calcium carbonate in the sections of the cut sheets in Example 2 and Example 3 were measured. The occupancy rate of calcium carbonate in Example 2 was 22.8% in Section 1, 21.4% in Section 2, 17.1% in Section 3, and 20.0% in Section 4 and the average occupancy rate was 20.3%. The occupancy rate of calcium carbonate in Example 3 was 22.8% in Section 1, 20.0% in Section 2, 20.0% in Section 3, and 18.6% in Section 4 and the average occupancy rate was 20.3%.

On the other hand, the theoretical occupancy rates of calcium carbonate of Examples 2 and 3 in each one end face were calculated. Specifically, the theoretical occupancy rates of calcium carbonate were calculated by multiplying the percent by mass of calcium carbonate (59.7% by mass) by the value obtained by dividing the density of the cut sheet (1076 [kg/m$^3$]) (not including the coated part) by the density of calcium carbonate (2.71 [g/cm$^3$]). As a result of the calculation, the theoretical occupancy rate of calcium carbonate was 23.7% by mass. The porosities of Examples 2 and 3 were calculated and found to be about 28.9%.

Figure 2:
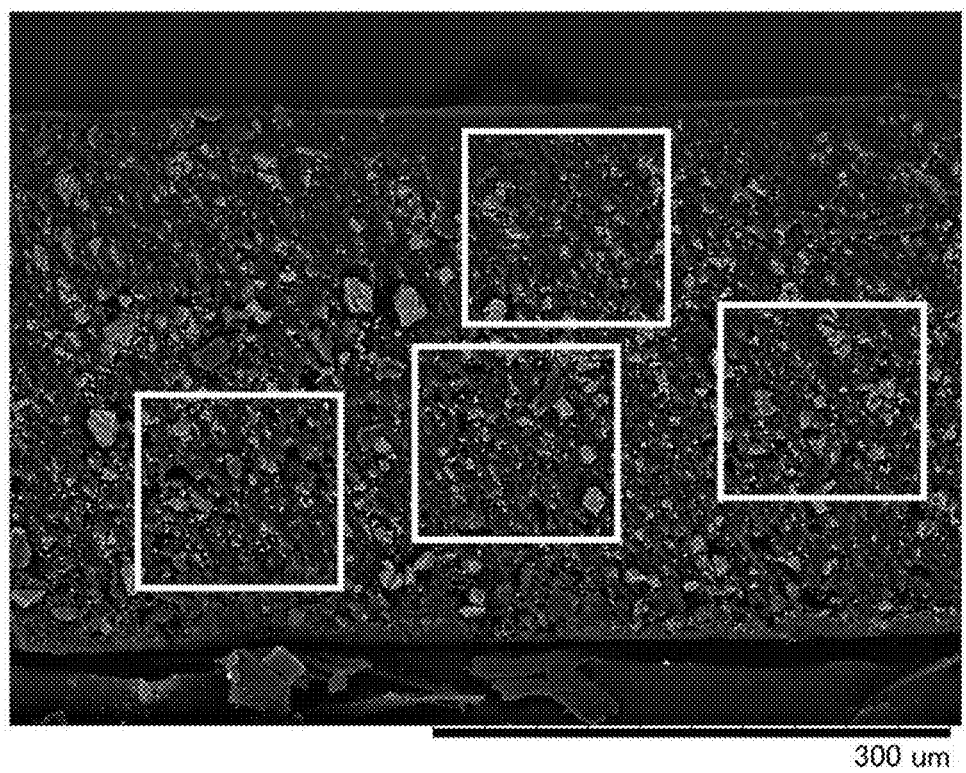
FIG. 2 is a photograph illustrating an electron microscopic image of the section of the sheet obtained in Example 3.
Figure 3:
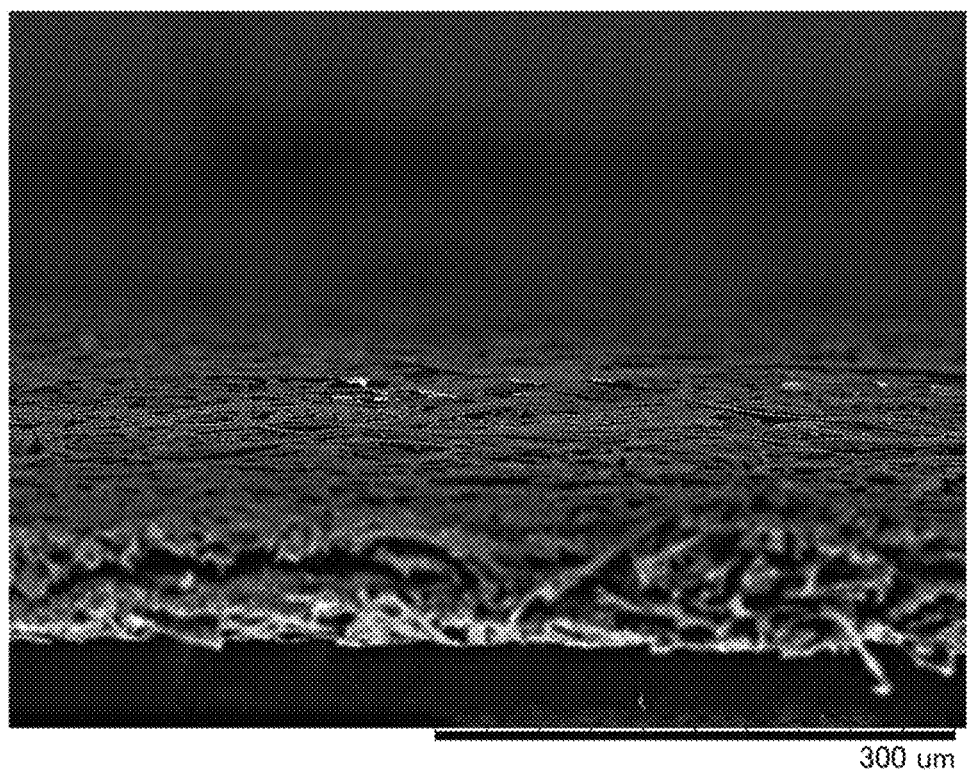
FIG. 3 is a photograph illustrating an electron microscopic image of the section of a paper.

As can be seen from the results of FIG. 1 and FIG. 2, it was found that the cut sheets had few sharp protrusions in the end face and thus cuts were difficult to be generated on the fingers or the like of the user. It was found that the sheet of Example 3 also had fewer protrusions in the end face.

As described above, the theoretical occupancy rate of calcium carbonate in the end faces of Examples 2 and 3 was 23.7% by mass. On the other hand, the difference between such a value and the actual average occupancy rate of calcium carbonate in the end faces of Examples 2 and 3 of 20.3% was 3.4%. The actual average occupancy rate of calcium carbonate in the end faces of practical Examples 2 and 3 is lower than the theoretical occupancy rate of calcium carbonate in the end faces of Examples 2 and 3. The reason why such a difference is observed is that a part of the surfaces of calcium carbonate is believed to be covered with the polypropylene resin at the time of cutting the sheet. Such covering is believed to reduce the number of sharp protrusions and thus cuts on the fingers or the like of the user are difficult to be generated. In addition, such covering is presumed to be one of the reasons why Examples 2 and 3 exhibit excellent water resistance despite containing a large amount of calcium carbonate and having the cut end faces.

As can be seen from the result of FIG. 3, in the paper sheet, fiber bundles are exposed in the section by cutting to emerge as sharp protrusions. The sharp protrusions made of these fibers are not straight lines like a blade and thus the sharp protrusions are considered to generate cuts on the fingers of the user causing strong pain like cuts generated by a saw if relative speed to the movement between the sharp protrusions and the fingers of the user exists. In contrast, the cut sheets illustrated in FIG. 1 and FIG. 2 are considered to have fewer sharp protrusions as described above and thus to be capable of reducing generation of cuts on the fingers or the like of the user.

In Examples 2 and 3, the sharp protrusions were fewer in the end face at the side of the sheet surface which is coated with the acrylic coating or the urethane coating. This reduction is presumed to be due to the acrylic coating or the urethane coating.

The invention claimed is:

1. A cut sheet that is formed of a resin composition including inorganic particles of 50% by mass or larger relative to a total mass of the composition and a thermoplastic resin, wherein
the cut sheet has a water absorption rate of 10% or lower measured in accordance with JIS K-7209, and
an actual occupancy rate of an exposed area of inorganic particles is lower by at least 2% than a theoretical occupancy rate of an area of inorganic particles in at least one end face.

2. The cut sheet according to claim 1, wherein a cured film of a resin composition including a synthetic resin and/or a natural resin is formed on one surface or both surfaces of the cut sheet as a separate body from the cut sheet.

3. The cut sheet according to claim 1, wherein the cut sheet has a size of B3 size defined in JIS P0138 or smaller.

4. The cut sheet according to claim 1, wherein the cut sheet is used for reducing generation of cuts.

5. A method for reducing cuts generated by a cut sheet, the method comprising:
setting an actual occupancy rate of an exposed area of inorganic particles lower than a theoretical occupancy rate of an area of inorganic particles in at least one end face in the cut sheet formed of a resin composition including the inorganic particles of 50% by mass or larger relative to a total mass of the composition and a thermoplastic resin,
wherein the inorganic particles are calcium carbonate and have an average particle diameter of 0.1 μm to 50 μm, and
the thermoplastic resin comprises at least one selected from the group consisting of polypropylene and polyethylene.

6. A method for reducing cuts generated by a cut sheet, the method comprising:
covering at least a part of surfaces of inorganic particles with a thermoplastic resin in at least one end face in the cut sheet formed of a resin composition including the inorganic particles of 50% by mass or larger relative to a total mass of the composition and the thermoplastic resin,
wherein the inorganic particles are calcium carbonate and have an average particle diameter of 0.1 μm to 50 μm, and
the thermoplastic resin comprises at least one selected from the group consisting of polypropylene and polyethylene.

* * * * *